(12) United States Patent
Yoshimoto et al.

(10) Patent No.: US 11,104,382 B2
(45) Date of Patent: Aug. 31, 2021

(54) VEHICLE REAR STRUCTURE

(71) Applicant: Toyota Jidosha Kabushiki Kaisha, Toyota (JP)

(72) Inventors: Masanori Yoshimoto, Okazaki (JP); Takahiro Momose, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 81 days.

(21) Appl. No.: 16/435,957

(22) Filed: Jun. 10, 2019

(65) Prior Publication Data

US 2019/0375459 A1 Dec. 12, 2019

(30) Foreign Application Priority Data

Jun. 11, 2018 (JP) .............................. JP2018-111306

(51) Int. Cl.
*B62D 21/11* (2006.01)
*B62D 21/15* (2006.01)
*B62D 25/08* (2006.01)

(52) U.S. Cl.
CPC ............ *B62D 21/11* (2013.01); *B62D 21/155* (2013.01); *B62D 25/08* (2013.01)

(58) Field of Classification Search
CPC ...... B62D 21/11; B62D 21/15; B62D 21/152; B62D 21/155; B62D 21/20; B62D 25/08; B62D 25/20; B62D 25/2009; B62D 25/2027; B60Y 2306/01
USPC ..... 280/788, 784, 124.109; 296/204, 203.04, 296/187.11
See application file for complete search history.

(56) References Cited

U.S. PATENT DOCUMENTS

2006/0202519 A1* 9/2006 Latimer, III ....... B62D 25/2027
296/203.04

FOREIGN PATENT DOCUMENTS

JP 2013-067234 A 4/2013

* cited by examiner

*Primary Examiner* — Keith J Frisby
(74) *Attorney, Agent, or Firm* — Dinsmore & Shohl LLP

(57) ABSTRACT

A rear side member rear includes a bottom plate, an upper plate, and a side plate that connects the bottom plate and the upper plate. On the bottom plate, a body mount bracket rear is provided. A fastening member fastens a vehicle length direction rearward of a rear suspension member upward to the body mount bracket rear. On the upper plate, a step structure, which is a fragile section, is formed further forward than a center axis of the suspension member bolt fastened to the body mount bracket rear.

12 Claims, 14 Drawing Sheets

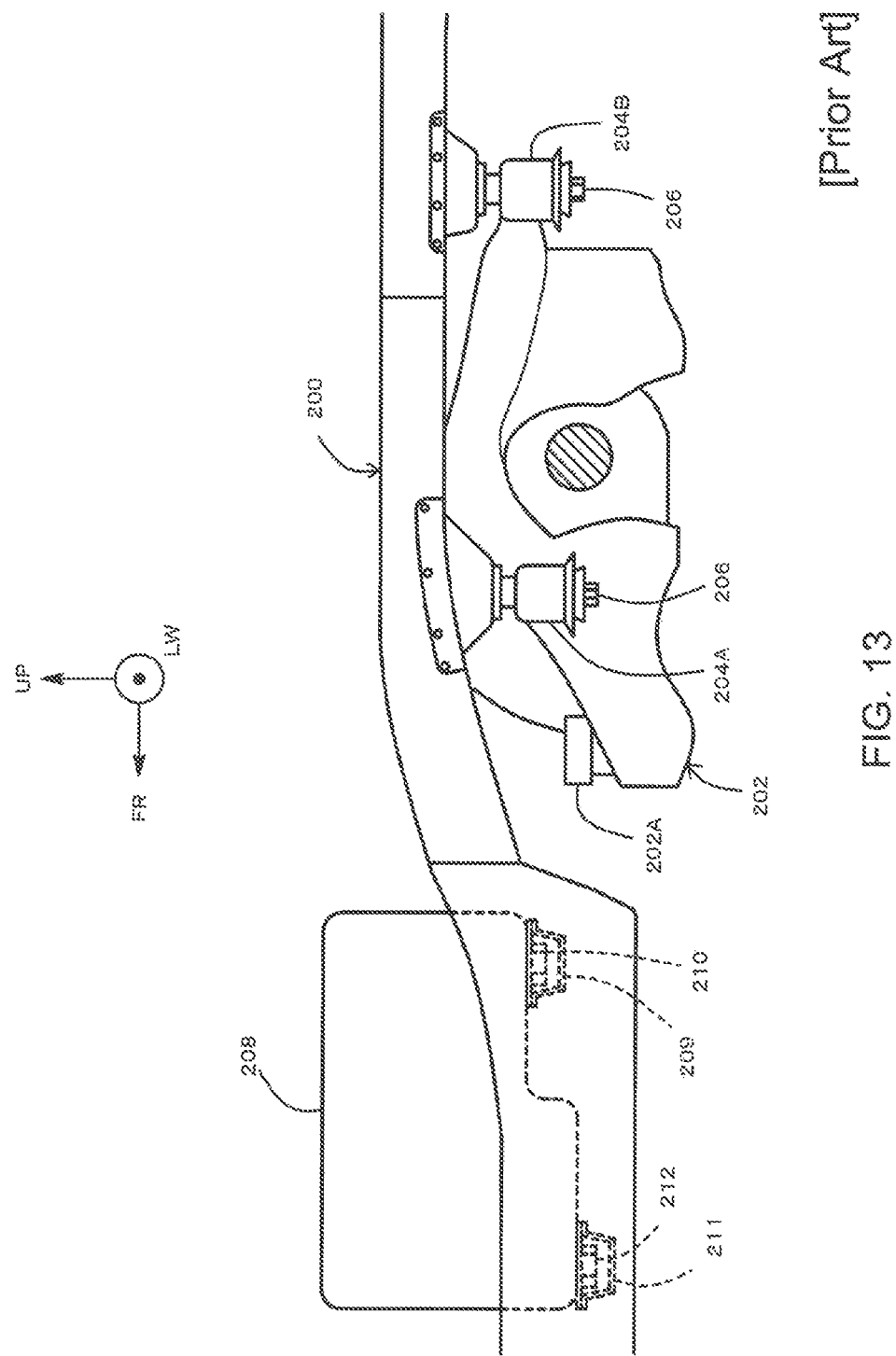
FIG. 13 [Prior Art]

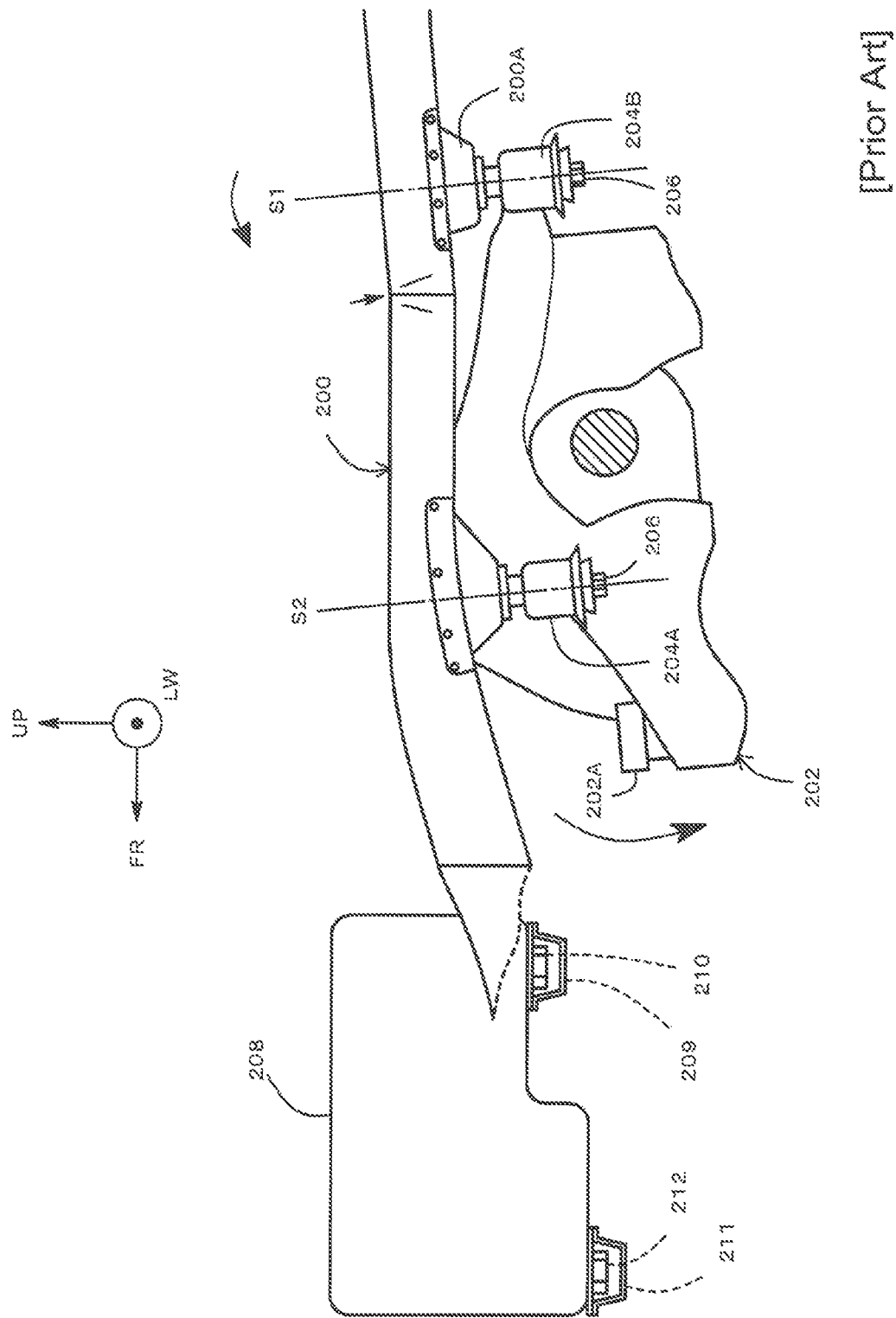
FIG. 14 [Prior Art]

VEHICLE REAR STRUCTURE

CROSS-REFERENCE TO RELATED APPLICATIONS

This application claims priority to Japanese Patent Application No. 2018-111306, filed on Jun. 11, 2018, which is incorporated herein by reference in its entirety including the specification, claims, drawings, and abstract.

TECHNICAL FIELD

The present disclosure relates to a vehicle rear structure.

BACKGROUND

A rear side member, which is a skeleton member, is provided in a vehicle rear. A pair of rear side members are provided on respective sides in a vehicle width direction and extend in a vehicle length direction. The rear end of the rear side member is connected to a bumper reinforcement, which is a reinforcing member, at the vehicle rear end.

A rear suspension member is hung and supported from the rear side member. The rear suspension member is a supporting member that supports a suspension mechanism of a rear wheel. As illustrated in JP 2013-67234 A and a vehicle side view of FIG. 13, a rear suspension member 202 is fastened to and supported by a rear side member 200 via a fastening member 206 such as a bolt.

Referring to FIG. 13, the rear suspension member 202 includes four arms extended in a vehicle width direction and a vehicle length direction. Specifically, the rear suspension member 202 includes a pair of front arms 204A provided at both ends in the vehicle width direction in the front and a pair of rear arms 204B provided at both ends in the vehicle width direction in the rear.

The fastening member 206 is inserted upward in the vertical direction from the front arms 204A and the rear arms 204B, and the upper end of the fastening member 206 is inserted to the rear side member 200, whereby the rear suspension member 202 is fastened to and supported by the rear side member 200.

SUMMARY

Incidentally, when a so-called rear collision, in which an obstacle collides with a vehicle rear surface, occurs, a shock load is transmitted to the rear side member 200, which is a skeleton member. Since the shock load is mainly input to a direction along an extending direction of the rear side member 200, a compression load is mainly input to the rear side member 200. The rear side member 200 buckles when the compression load exceeds a withstanding load of the rear side member 200.

According to collapse deformation in the vehicle length direction of the rear side member 200, the rear suspension member 202 suspended by the rear side member 200 moves forward. In the forward movement, the rear suspension member 202 and a member placed further forward than the suspension member 202 are likely to collide.

A battery module 208 is provided, for example, in the front of the rear suspension member 202 and below a rear seat of the vehicle. A rear fastening section 210 fastened to a floor cross member 209, which is a skeleton member extended in the vehicle width direction, is provided at the rear lower end of the battery module 208. A front fastening section 212 fastened to a floor cross member 211 is provided at the front lower end of the battery module 208.

If the rear suspension member 202 collides with the rear fastening section 210, a compression load of compression between the front fastening section 212 and the rear fastening section 210 (urged forward) is applied to the battery module 208.

In order to avoid such collision, for example, as shown in FIG. 14, it is conceivable to set the rear suspension member 202 in a so-called forward tilting posture in which a front end portion 202A of the rear suspension member 202 is pulled down during the rear collision. In the forward tilting posture, the front end portion 202A of the rear suspension member 202 is located below the rear fastening section 210 of the battery module 208. The rear end portion 202A and the rear fastening section 210 pass each other and collision is avoided.

An example of a deformation form (a buckling form) of the rear side member 200 for setting the rear suspension member 202 in the forward tilting posture during the rear collision is as shown in FIG. 14. That is, the rear side member 200 is buckled and deformed such that a part of the rear side member 200 in the front of a fastening section 200A to the rear arm 204B is bent downward. As a result of such buckling deformation, a fastening axis S1 of the rear arm 204B of the rear suspension member 202 is inclined counterclockwise in a side view such that the upward direction changes towards the forward direction and the downward direction changes towards the rearward direction. According to the inclination of the fastening axis S1 of the rear arm 204B, a fastening axis S2 of the front arm 204A is inclined in the same manner as the fastening axis S1. Since the fastening axes S1 and S2 are inclined such that the upward direction changes towards the forward direction and the downward direction changes towards the rearward direction, the rear suspension member 202 takes the forward tilting posture.

In this way, in order to avoid collision of the rear suspension member 202 and the rear fastening section 210 of the battery module 208, the rear side member 200 desirably takes the desired deformation form (bent form) described above. However, an input direction of a collision load, the magnitude of the load, and the like are random. In the conventional vehicle rear structure, it has been difficult to stably buckle and deform the rear side member 200 to the desired deformation form with respect to such a random load input.

It is an advantage of the present disclosure to provide a vehicle rear structure capable of stably buckling and deforming, downward, with respect to an input of a collision load during rear collision, a part of a rear side member in the front of a fastening section of a rear suspension member to a rear arm.

The present disclosure relates to a vehicle rear structure. The structure includes rear side members and a rear suspension member. The rear side members are provided on respective sides in a vehicle width direction in a vehicle rear and extend in a vehicle length direction. The rear suspension member is hung and supported by the rear side members.

Each of the rear side members includes a bottom plate, an upper plate, and a side plate that connects the bottom plate and the upper plate. On the bottom plate, a front fastening section and a rear fastening section are provided. A fastening member fastens a vehicle length direction frontward of the rear suspension member upward to the front fastening section. Another fastening member fastens a vehicle length direction rearward of the rear suspension member upward to the rear fastening section. On the upper plate, a fragile section is formed further forward than a center axis of the fastening member fastened to the rear fastening section.

Since the fragile section is formed on the upper plate of the rear side member, when a compression load is input to the rear side member during rear collision, the upper plate buckles from the fragile section prior to the bottom plate. At this time, the periphery of the fragile section of the rear side member is deformed into an arch shape convex downward by the upper plate reduced in a vehicle length direction length by the buckling and the bottom plate not yet buckled and maintaining a vehicle length direction length and, as a result, is bent downward. Since the fragile section is formed further forward than the center axis of the fastening member and is bent downward, an upper part of the center axis of the fastening member tilts forward. As a result, it is possible to set the rear suspension member in a forward tilting posture.

In the above disclosure, the rear side member may have a hat sectional shape opened upward including the bottom plate, a pair of the side plates, and a pair of the upper plates. In this case, in the pair of upper plates, a step structure is provided as the fragile section such that a ridgeline extended in the vehicle length direction is bent in a vehicle height direction.

When a load is input to the rear side member, a main transmission path (a load path) of the load is formed by the ridgeline having high rigidity in the rear side member. By forming the step structure for bending the ridgeline, stress concentration occurs at a bending point and buckling in the bending point is facilitated.

In the above disclosure, a bracket coupled to the bottom plate and the upper plate of the rear side member may be provided in the rear side member. In this case, the bracket includes a bottom section coupled to the bottom plate of the rear side member, an upper part coupled to the upper plate, and an inclining section that connects the bottom section and the upper section and inclines front upward from the bottom section toward the upper section. The upper part of the bracket is coupled to the upper plate further rearward than the fragile section of the upper plate of the rear side member.

By providing the bracket, a load input to the bottom plate of the rear side member is transmitted to the upper plate via the bracket. By dispersing the load input to the bottom plate to the upper plate as well, it is possible to suppress the bottom plate from buckling earlier than the upper plate.

In the above disclosure, on the bottom plate of the rear side member, a reinforcing member may be provided behind the bracket. In this case, the bracket and the reinforcing member are separated in the vehicle length direction.

By providing a separation region where the bracket and the reinforcing member are separated and only the bottom plate is left, the separation region is easily buckled as compared with the front and the rear of the separation region. When the upper part of the center axis of the fastening member is tilted forward by the buckling of the fragile section, the separation region buckles upward. Therefore, it is possible to further increase the tilt of the center axis of the fastening member.

In the above disclosure, the rear side member may have a hat sectional shape opened upward including the bottom plate, a pair of the side plates, and a pair of the upper plates. In this case, a cutout is provided to traverse a ridgeline, which is a boundary between the upper plate and the side plate, in the vehicle width direction.

By providing the cutout that traverses the ridgeline, which is a main load path of the rear side member, a bending point is formed in the ridgeline and buckling in the bending point is facilitated.

In the above disclosure, on the upper plate of the rear side member, a thin section having a small plate thickness as compared with front and rear regions in the vehicle length direction of the upper plate may be formed as the fragile section.

When a compression load is input to the rear side member during rear collision, since the rear side member buckles from the periphery of the thin section, the rear side member is bent downward. Since the thin section is formed further forward than the center axis of the fastening member, the upper part of the center axis of the fastening member tilts forward according to the bending of the rear side member. As a result, it is possible to set the rear suspension member in a forward tilting posture.

In the above disclosure, on the upper plate of the rear side member, a through-opening piercing through the upper plate in the vehicle height direction may be formed as the fragile section.

When a compression load is input to the rear side member during rear collision, since the rear side member buckles from the periphery of the through-opening, the rear side member is bent downward. Since the through-opening is formed further forward than the center axis of the fastening member, the upper part of the center axis of the fastening member tilts forward according to the bending of the rear side member. As a result, it is possible to set the rear suspension member in a forward tilting posture.

According to the present disclosure, it is possible to stably buckle, downward, with respect to an input of a collision load during rear collision, a part of a rear side member in the front of a fastening section of a rear suspension member to a rear arm.

BRIEF DESCRIPTION OF THE DRAWINGS

The present disclosure will be further described with reference to the accompanying drawings, wherein like reference numerals refer to like parts in the several views, and wherein:

FIG. 13 is a side view illustrating a vehicle rear structure according to related art; and FIG. 14 is a side view illustrating a state during rear collision of the vehicle rear structure according to the related art.

DESCRIPTION OF EMBODIMENTS

A vehicle rear structure according to an embodiment is explained with reference to FIGS. 1 to 12. In FIGS. 1 to 12, a vehicle front-rear direction (hereinafter referred to as vehicle length direction as appropriate) is indicated by an axis represented by a sign FR. A vehicle width direction is indicated by an axis represented by a sign LW. A vertical direction (hereinafter referred to as vehicle height direction as appropriate) is indicated by an axis represented by a sign UP. The sign FR is an abbreviation of Front. A vehicle forward direction is a positive direction of the vehicle length direction axis FR. The sign LW is an abbreviation of Left Width. A vehicle width left direction is a positive direction of the vehicle width direction axis LW. An upward direction is a positive direction of the vehicle height direction axis UP.

The vehicle rear structure according to this embodiment may be a so-called hybrid vehicle that performs rear wheel driving with a rotary electric machine 60 and performs front wheel driving with an internal combustion engine. The front wheel driving may be performed by cooperation of the internal combustion engine and the rotary electric machine.

Figure 1:
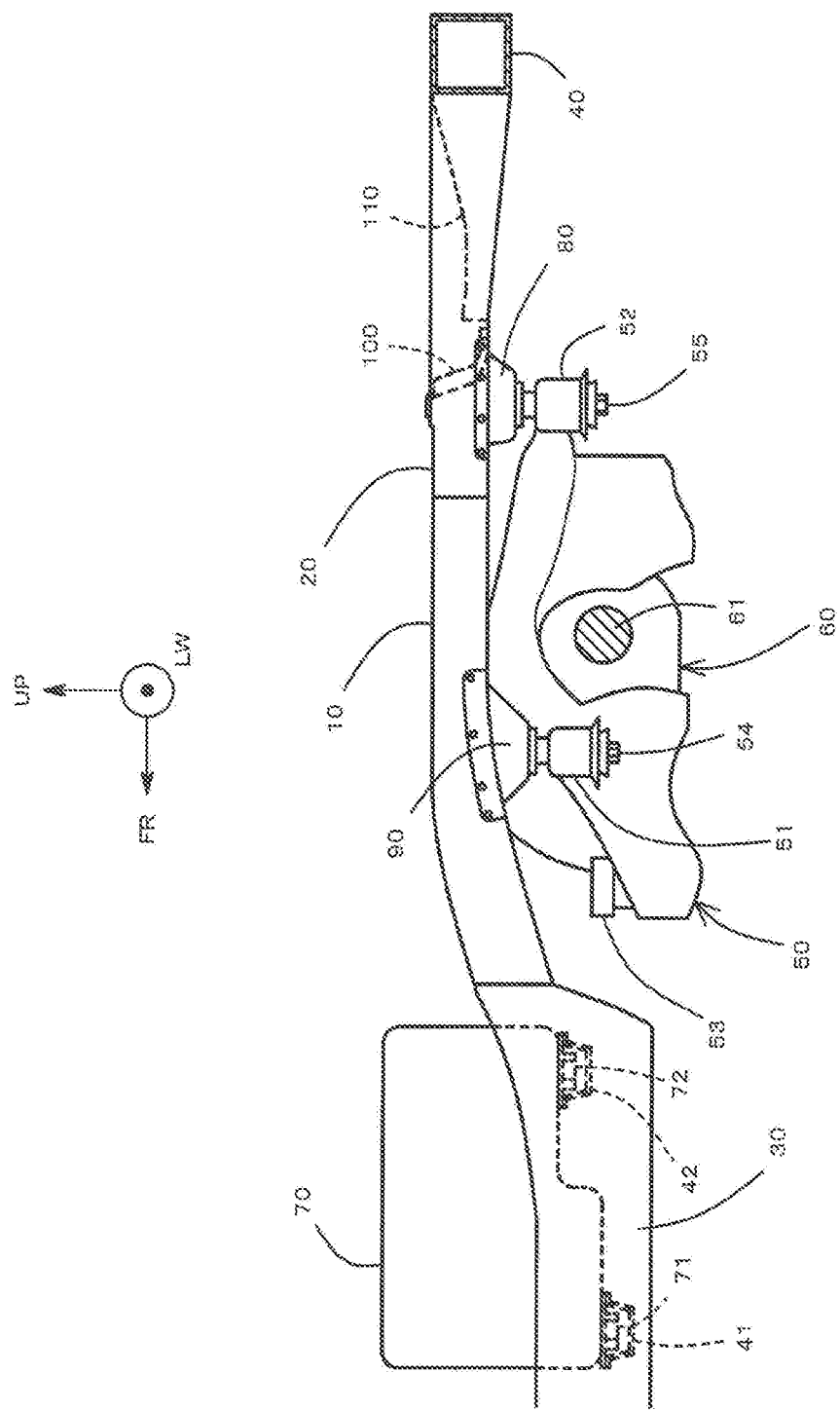
FIG. 1 is a side view illustrating a vehicle rear structure according to an embodiment.

A side view of the vehicle rear structure according to this embodiment is illustrated in FIG. 1. In FIG. 1, only a vehicle rear structure on a vehicle left side is illustrated. However, because of symmetry of a vehicle structure, a vehicle rear structure on a vehicle right side includes the same structure as the structure illustrated in FIG. 1.

The vehicle rear structure according to this embodiment includes a rear side member (a rear side front member 10 and a rear side rear member 20), a bumper reinforcement 40, and a rear suspension member 50.

The rear side member is a skeleton member provided on both sides in a vehicle width direction in a vehicle rear and extends in the vehicle length direction. For example, the rear side member is configured from a high-tension steel plate or a hot-stamp steel plate. For example, the rear side member includes the rear side front member 10 provided in a vehicle length direction front and the rear side rear member 20 provided in a vehicle length direction rear.

The front end of the rear side front member 10 is coupled to, by welding or the like, a rocker 30, which is a skeleton member provided at both ends in the vehicle width direction and extended in the vehicle length direction. In addition to the rocker 30, the front end of the rear side front member 10 is also coupled to, by welding or the like, a floor member (not shown in FIG. 1), which is a skeleton member extended in the vehicle length direction in parallel to the rocker 30, further on the vehicle width direction inner side than the rocker 30.

The front of the rear side front member 10 is a vehicle interior space (a cabin). In the rocker 30 and the not-shown floor member, floor cross members 41 and 42 extended in the vehicle width direction and functioning as skeleton members of a vehicle interior are provided.

A battery module 70 is provided on the floor cross members 41 and 42 and, for example, below a rear seat. The battery module 70 supplies electric power to the rotary electric machine 60 or the like for rear wheel driving. The lower end of the battery module 70 is fastened and fixed to the floor cross members 41 and 42. Specifically, the floor cross member 41 in the front and the battery module 70 are fastened by a bolt 71. The floor cross member 42 in the rear and the battery module 70 are fastened by a bolt 72.

The front end of the rear side rear member 20 is coupled to the rear side front member 10. The rear end of the rear side rear member 20 is coupled to the bumper reinforcement 40, which is a reinforcing member at the vehicle rear end. Therefore, during rear collision, a shock load is transmitted in a path from the bumper reinforcement 40 to the rear side rear member 20, the rear side front member 10, and the rocker 30. Details of the rear side rear member 20 are explained below.

The rear suspension member 50 is hung and supported from the rear side member (the rear side front member 10 and the rear side rear member 20). The rear suspension member 50 is a supporting member that supports a not-shown suspension mechanism.

The rear suspension member 50 includes four arms extended in the vehicle width direction and the vehicle length direction. Specifically, the rear suspension member 50 includes a pair of front arms 51 provided at both ends in the vehicle width direction in the front and a pair of rear arms 52 provided at both ends in the vehicle width direction in the rear. Only the vehicle left side is illustrated in the side view of FIG. 1. However, the vehicle right side includes the same structure as the structure shown in FIG. 1.

Figure 3:
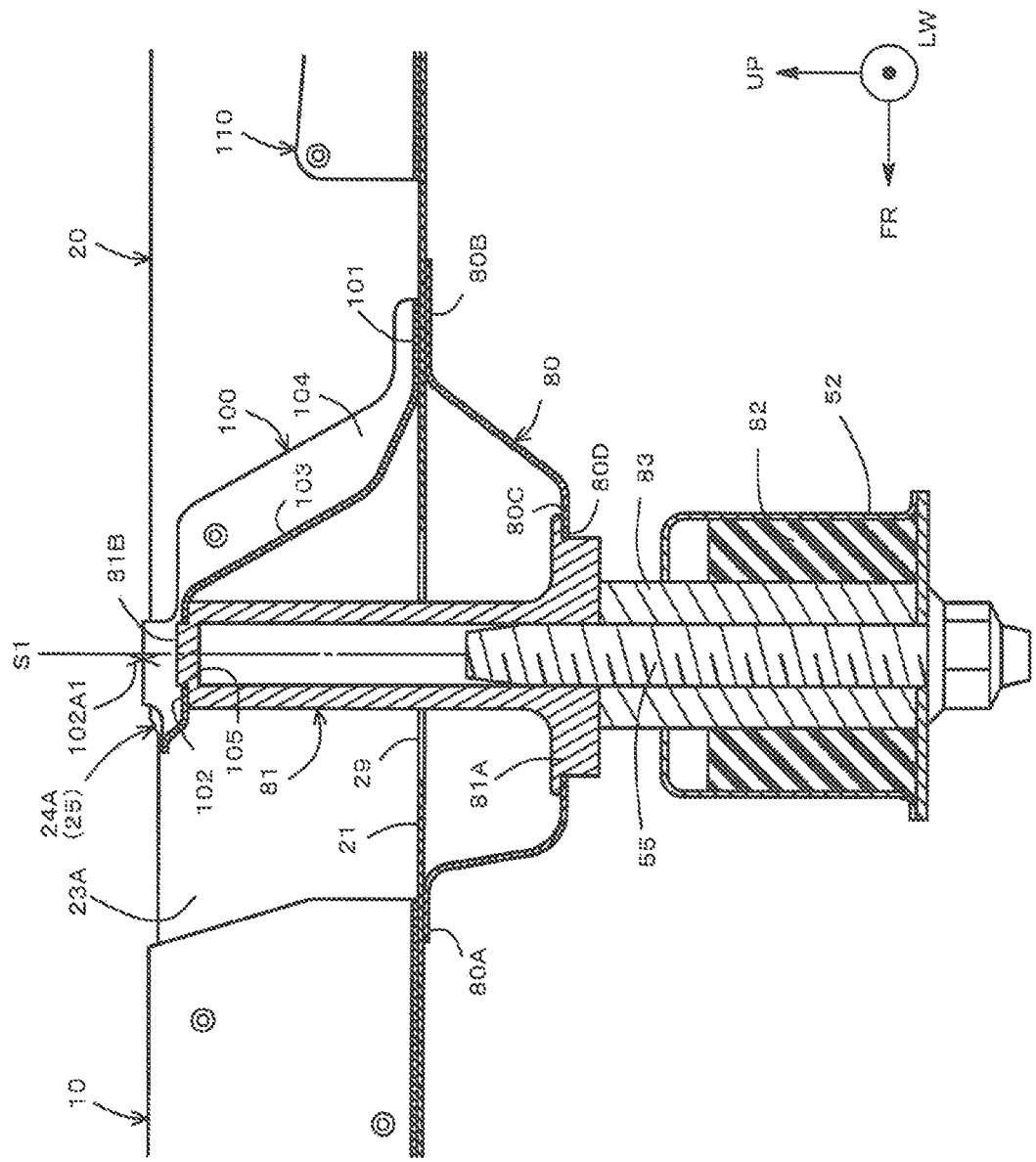
FIG. 3 is an A-A sectional view of FIG. 2.
Figure 4:
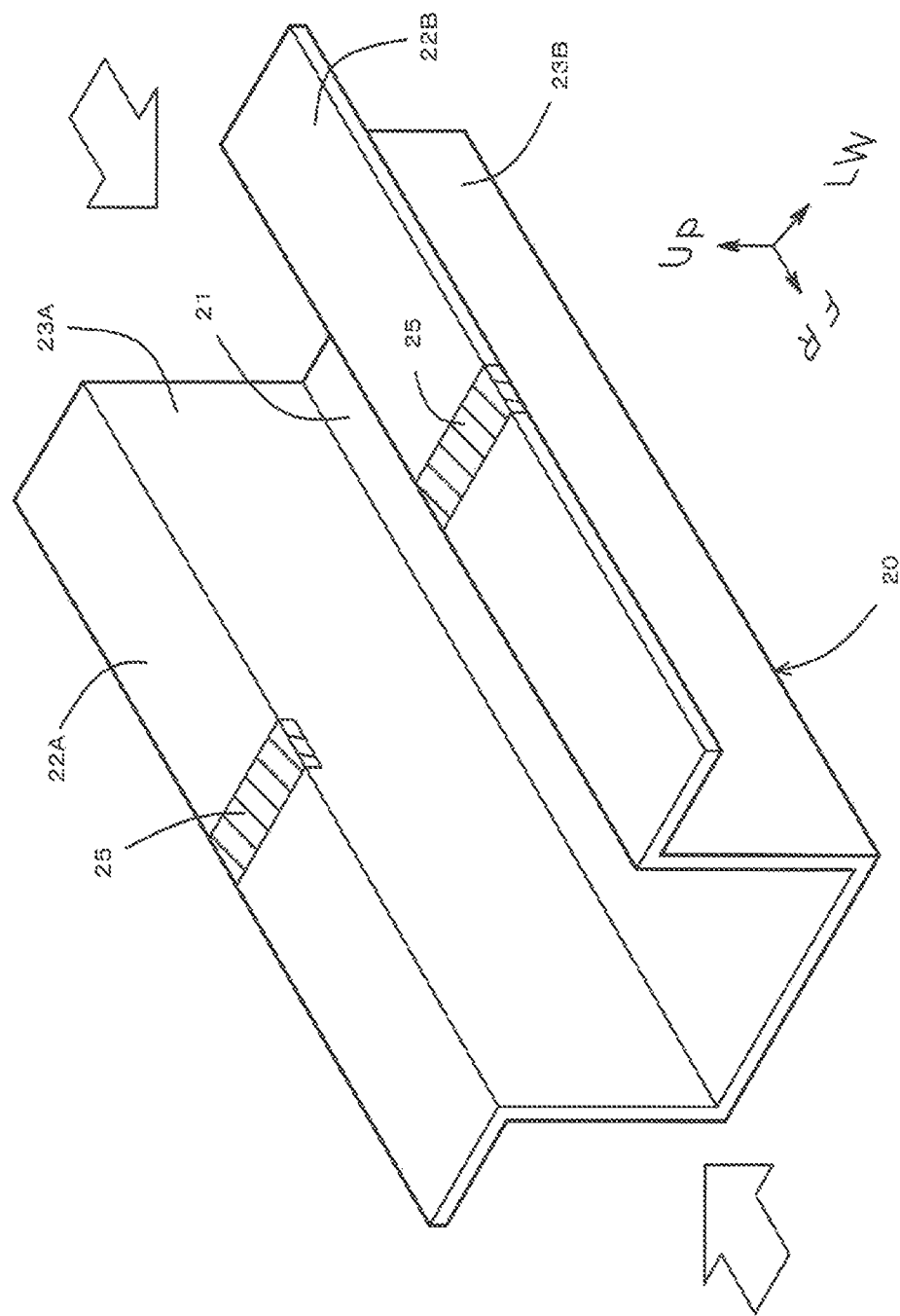
FIG. 4 is a diagram (1/2) for explaining a downward convex bend during rear collision of a rear side member according to the embodiment.

Referring to FIG. 3, an opening piercing through the rear arm 52 in the vehicle height direction is provided in the rear arm 52. A suspension member bolt 55, which is a fastening member, is inserted into the opening upward in a vehicle height direction. The rear arm 52 includes a collar 83, which is a hollow structure and into which the suspension member bolt 55 is inserted. A cylindrical bush 82, which is a buffer member, is provided in the outer circumference of the collar 83. The bush 82 is made of a resin material such as rubber.

The upper end portion of the suspension member bolt 55 is projected upward piercing through the collar 83 and the rear arm 52 and is screwed into a tube nut 81 fixed to a rear body mount bracket 80. The rear body mount bracket 80 is coupled to the rear side rear member 20 by welding or the like. With such a structure, the rear body mount bracket 80 and the tube nut 81 fixed to the rear body mount bracket 80 have a function of a rear fastening section that fastens and supports the rear of the rear suspension member 50.

As explained below, an upper part of the tube nut 81 falls down towards the vehicle front during rear collision, whereby the rear suspension member 50 is turned to a forward tilting posture. Therefore, a rigid member or the like may not be disposed, so as not to hinder the falling-down further in the vehicle front than the tube nut 81, at least on a track of the falling-down of the tube nut 81. An opening diameter of an opening 29 of the rear side rear member 20 into which the tube nut 81 is inserted may be larger than the diameter of the tube nut 81, so as not to hinder the falling-down of the tube nut 81.

A fastening structure around the rear arm 52 is illustrated in FIG. 3. Basically, the front arm 51 includes the same structure as the fastening structure. That is, referring to FIG.

1, a suspension member bolt 54 is inserted upward from the bottom of the front arm 51. The upper end portion of the suspension member bolt 54 is screwed into a tube nut (not shown in FIG. 3) fixed to a front body mount bracket 90. The front body mount bracket 90 is coupled to the rear side front member 10 by welding or the like. With such a structure, the front body mount bracket 90 and the not-shown tube nut fixed to the front body mount bracket 90 have a function of a front fastening section that fastens and supports the front of the rear suspension member 50.

In this way, in the front of the rear suspension member 50, the front arm 51 and the front body mount bracket 90 are fastened and fixed by the suspension member bolt 54. In the rear of the rear suspension member 50, the rear arm 52 and the rear body mount bracket 80 are fastened and fixed by the suspension member bolt 55.

The rotary electric machine 60 for rear wheel driving is mounted on the rear suspension member 50 according to this embodiment, in addition to a suspension mechanism for a rear wheel. For example, a rear wheel shaft 61 is provided in the rotary electric machine 60 as an output shaft. The rotary electric machine 60 is fastened and fixed to the rear suspension member 50 by a motor support 53 in the front and a motor support (not shown in FIG. 1) in the rear of the rear suspension member 50.

In this way, the rotary electric machine 60 for rear wheel driving is mounted on the rear suspension member 50 according to this embodiment in addition to the suspension mechanism for the rear wheel. In order to secure a mounting space for the rotary electric machine 60 and in order to withstand the weight of the rotary electric machine 60, the rear suspension member 50 is increased in size compared with a normal rear suspension member not mounted with the rotary electric machine 60.

Therefore, a separation distance between the front end portion; for example, the motor support 53 of the rear suspension member 50, and the rear fastening section; that is, the bolt 72 and the floor cross member 42 of the battery module 70 in the front of the rear suspension member 50, is reduced from the separation distance of the conventional rear suspension member (not mounted with the rotary electric machine 60). In such a layout, in particular, necessity of forward tilting turning of the rear suspension member 50 during rear collision explained below is high as compared with the conventional rear suspension member.

Figure 2:
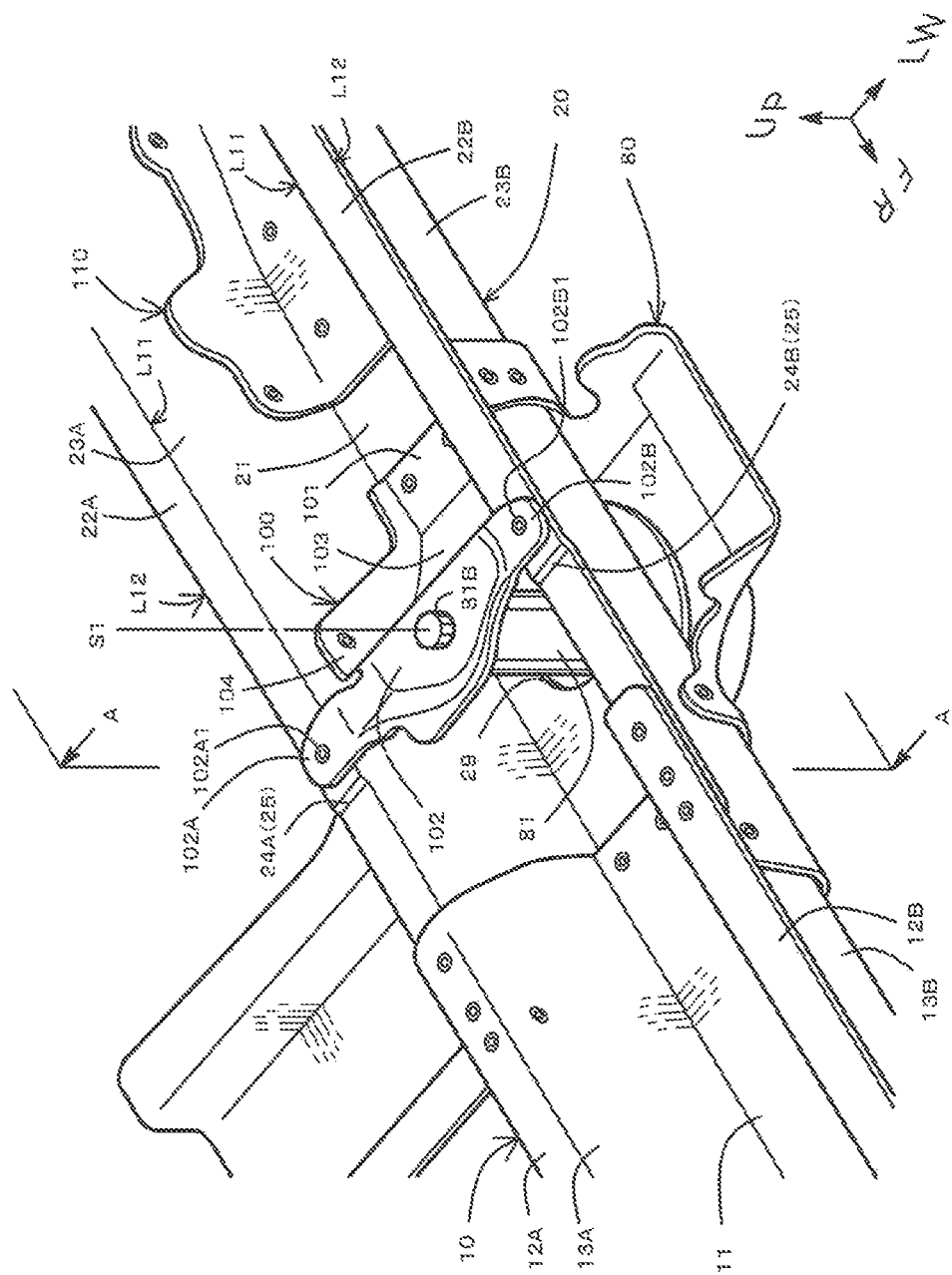
FIG. 2 is a perspective view illustrating a front portion of a rear side member rear.

A peripheral structure of a front portion of the rear side rear member 20 is illustrated in FIG. 2. The rear side rear member 20 is formed in a sectional hat shape opened upward including a bottom plate 21, a pair of upper plates 22A and 22B, and a pair of side plates 23A and 23B that connect the bottom plate 21 and the pair of upper plates 22A and 22B. Further, a not-shown panel member such as a floor panel is joined to the pair of upper plates 22A and 22B by welding or the like, whereby the rear side rear member 20 is formed in a closed sectional shape.

The front end of the rear side rear member 20 is coupled and fixed to the rear end of the rear side front member 10. Like the rear side rear member 20, the rear side front member 10 includes a bottom plate 11, a pair of upper plates 12A and 12B, and a pair of side plates 13A and 13B that connect the bottom plate 11 and the pair of upper plates 12A and 12B.

In coupling of the front end of the rear side rear member 20 and the rear end of the rear side front member 10, rear ends and front ends of the bottom plates 11 and 21, the side plates 13A and 23A, the side plates 13B and 23B, and the upper plates 12A and 22A are respectively superimposed and coupled by welding or the like. In FIGS. 2, 3, and 6 to 12, welding points are indicated by double circles.

A rear fastening section fastened to a rear portion of the rear suspension member 50 is provided on the bottom plate 21 of the side rear member rear 20. Specifically, referring to FIG. 2 and FIG. 3, which is an A-A side sectional view of FIG. 2, the rear body mount bracket 80 and the tube nut 81 are provided on the bottom plate 21 as the rear fastening section. The inside of the tube nut 81 is hollow. The upper end portion of the suspension member bolt 55 is screwed into the inside of the hollow.

The rear body mount bracket 80 has a shape projecting to the vehicle height direction lower side. Flanges 80A and 80B provided in the front and the rear in the vehicle length direction and the bottom plate 21 of the rear side rear member 20 are coupled and fixed by welding or the like.

An opening 80D piercing through a bottom section 80C of the rear body mount bracket 80 in the vehicle height direction is formed in the bottom section 80C. A flange 81A of the tube nut 81 is seated in the opening 80D. The tube nut 81 and the rear body mount bracket 80 are coupled by welding a seating point of the flange 81A.

The opening 29 for inserting through the tube nut 81 is provided on the bottom plate 21 of the rear side rear member 20. Further, a small diameter section 81B is formed at the upper end of the tube nut 81; that is, a side opposed to the flange 81A. The small diameter section 81B is inserted into a receiving hole 105 of a nut receiving bracket 100. It is possible to suppress movement (wobbling) of the tube nut 81 around the center axis S1 by supporting the upper end of the tube nut 81 with the nut receiving bracket 100.

The nut receiving bracket 100 is a supporting member for suppressing the wobbling of the tube nut 81 as explained above. In addition, the nut receiving bracket 100 according to this embodiment also has a function of transmitting a load input to the bottom plate 21 of the rear side rear member 20 during rear collision to the upper plates 22A and 22B.

Referring to FIGS. 2 and 3, the nut receiving bracket 100 include a bottom section 101, an upper section 102, and an inclining section 103 and a pair of side sections 104 that connect the bottom section 101 and the upper section 102.

The bottom section 101 of the nut receiving bracket 100 is coupled and fixed to the bottom plate 21 of the rear side rear member 20 by welding or the like. As illustrated in FIGS. 2 and 3, the bottom section 101 of the nut receiving bracket 100 is provided further in the vehicle rear than the upper section 102.

The receiving hole 105, into which the small diameter section 81B of the tube nut 81 is inserted, is formed in the vehicle width direction center of the upper section 102 of the nut receiving bracket 100. Upper flanges 102A and 102B coupled and fixed to the pair of upper plates 22A and 22B of the rear side rear member 20 by welding or the like are provided at both ends in the vehicle width direction of the upper section 102.

The inclining section 103 connects the bottom section 101 and the upper section 102. The inclining section 103 is inclined upward in the vehicle front direction from the bottom section 101 to the upper section 102. By adopting such a structure, a load is transmitted from the bottom section 101 to the upper section 102. Further, the load is transmitted from the upper flanges 102A and 102B of the upper section 102 to the upper plates 22A and 22B of the rear side rear member 20.

In FIG. 3, a welding point 102A1 of the upper flange 102A and the upper plate 22A of the rear side rear member 20 is indicated by x. As shown in FIGS. 2 and 3, welding points 102A1 and 102B1 of the upper flanges 102A and 102B and the upper plates 22A and 22B of the rear side rear member 20 are provided further in the vehicle rear than step structures 24A and 24B (fragile sections 25). In addition, the welding points 102A1 and 102B1 are provided further in the vehicle front than the center axis S1 (the fastening axis) of the suspension member bolt 55.

Since the welding points 102A1 and 102B1 are provided further in the vehicle rear than the step structures 24A and 24B (the fragile sections 25), a load transmitted from the welding points 102A1 to 102B1 is transmitted to the step structures 24A and 24B.

In addition, since the welding points 102A1 and 102B1 are provided further in the vehicle front than the center axis S1 (the fastening axis) of the suspension member bolt 55, a transmission point for transmitting a load from the upper section 102 of the nut receiving bracket 100 to the upper plates 22A and 22B of the rear side rear member 20 during rear collision is provided further in the vehicle front than the center axis S1 (the fastening axis) of the suspension member bolt 55. Forward tilting turning (counterclockwise turning in FIG. 3) of the center axis S1 is facilitated.

Besides the nut receiving bracket 100, a side member reinforcement 110 is provided on the inside of the rear side rear member 20. The side member reinforcement 110 is a reinforcing member that is provided behind the nut receiving bracket 100 and suppresses buckling deformation (bending deformation) of the rear side rear member 20.

As illustrated in FIG. 3, the nut receiving bracket 100 and the side member reinforcement 110 are separated in the vehicle length direction. A separation region between the nut receiving bracket 100 and the side member reinforcement 110 is formed as a structure in which the bottom plate 21 of the rear side rear member 20 is not reinforced by other members. That is, the separation region has low rigidity as compared with regions in the front and the rear in the vehicle length direction of the separation region. The separation region is formed as a structure in which an upward convex bend explained below is easily caused in the separation region.

Referring to FIG. 2, the step structures 24A and 24B functioning as the fragile sections 25 are formed on the upper plates 22A and 22B of the rear side rear member 20. An action effect of providing the fragile sections 25 on the upper plates 22A and 22B of the rear side rear member 20 is explained with reference to FIGS. 4 and 5.

In rear collision, a collision load is input from the rear end of the rear side rear member 20. The collision load is mainly a load along an extending direction of the rear side rear member 20. Reaction (stress) is generated from the front of the rear side rear member 20 to resist the load. The rear side rear member 20 receives a compression load.

Figure 5:
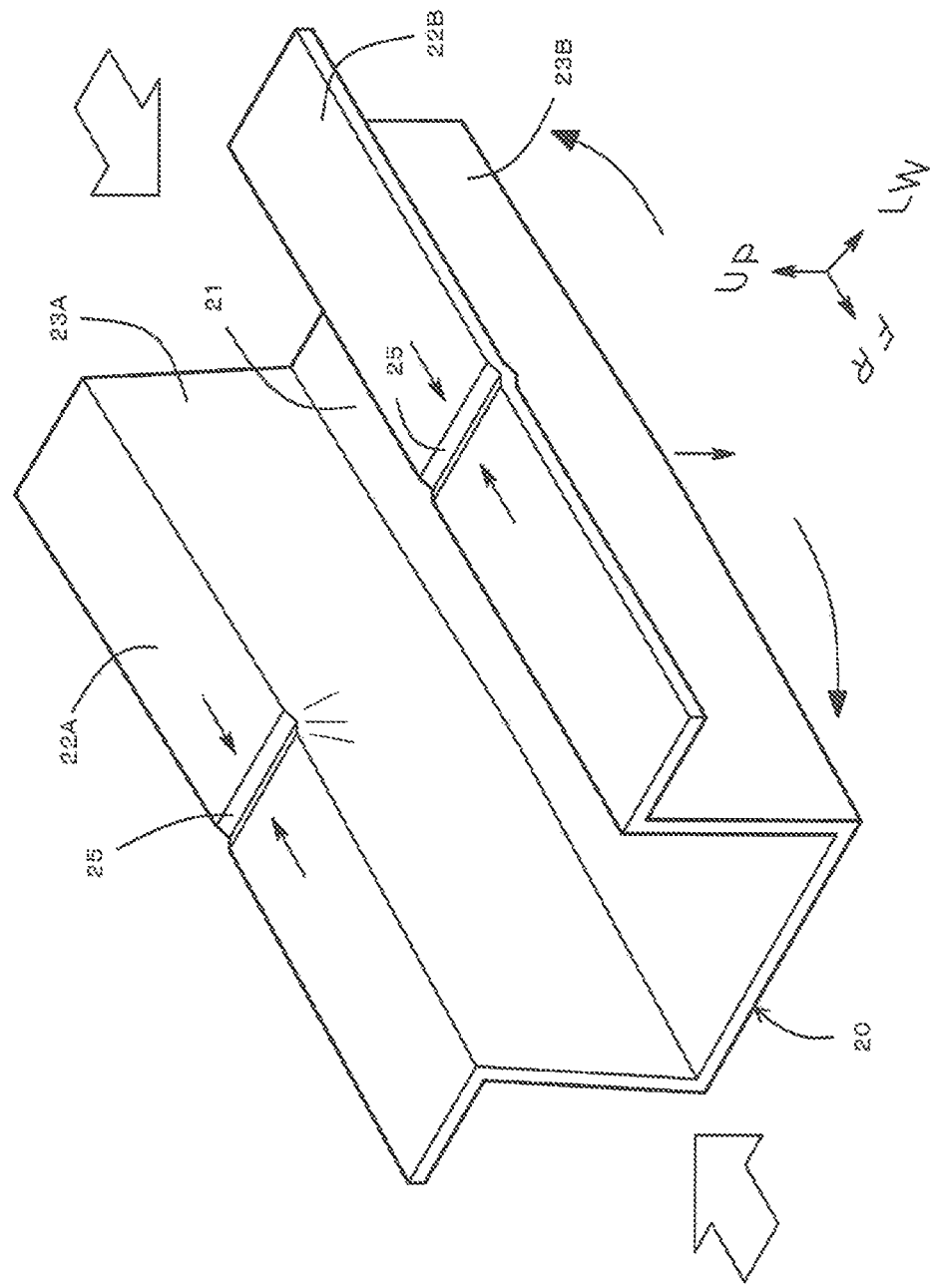
FIG. 5 is a diagram (2/2) for explaining the downward convex bend during the rear collision of the rear side member according to the embodiment.

In the structure of the rear side rear member 20, the fragile sections 25 are formed to have a low withstanding load as compared with the other parts. Therefore, the fragile sections 25 buckle (collapse) earlier than the other parts as illustrated in FIG. 5. At this time, whereas the vehicle length direction length of the upper plates 22A and 22B decreases according to the buckling, the vehicle length direction length of the bottom plate 21 not yet buckled is maintained. Then, as illustrated in FIG. 5, the shape of the rear side rear member 20 changes to an arch shape convex downward. When the input of the load further advances, the rear side rear member 20 is further bent and deformed downward along the arch shape convex downward.

Figure 6:
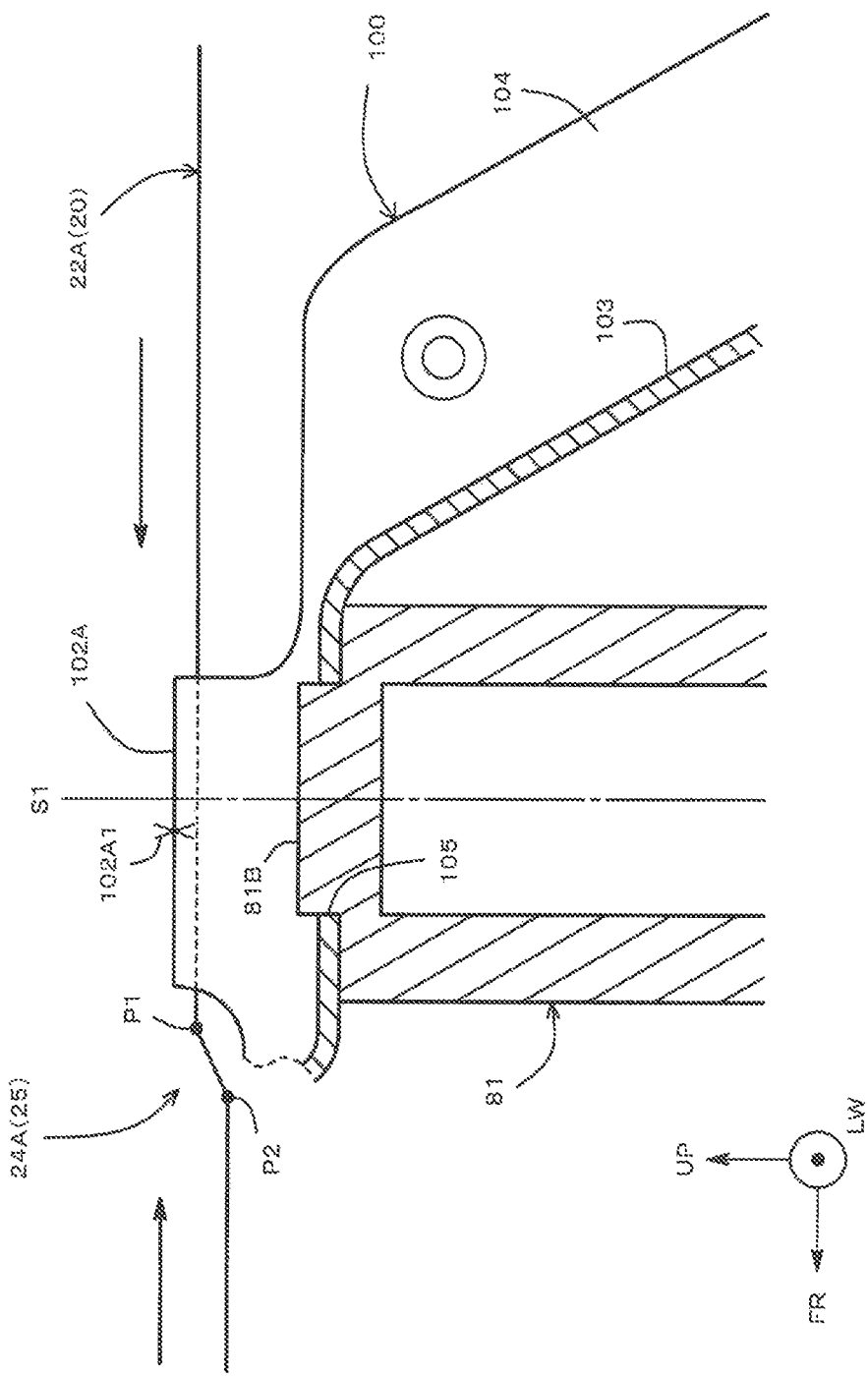
FIG. 6 is a diagram (1/3) for explaining a state during the rear collision of the vehicle rear structure according to the embodiment.

Referring to FIG. 6, in the rear side rear member 20 according to this embodiment, the fragile sections 25 (the step structures 24A and 24B) of the upper plates 22A and 22B are formed further frontward in the vehicle length direction than the center axis S1 (the fastening axis) of the suspension member bolt 55, which is the fastening member fastened to the rear fastening section (the rear body mount bracket 80 and the tube nut 81). The fragile sections 25 are formed frontward in the vehicle length direction in a range of, for example, 5 mm or more and 20 mm or less from the fastening axis S1.

Since the fragile sections 25 are formed in the front of the fastening axis S1, the fragile sections 25 are bent and deformed downward during rear collision. Therefore, the fastening axis S1 turns counterclockwise in FIG. 6; that is, the upward direction turns towards the forward direction and the downward direction turns towards the rearward direction. According to the turning, the rear suspension member 50 takes a forward tilting posture in which the front of the rear suspension member 50 is pulled down.

Referring to FIG. 2, the step structures 24A and 24B, which are the fragile sections 25, are formed in a structure for bending, in the vehicle height direction, a boundary line between the upper plates 22A and 22B and the side plates 23A and 23B; that is, a ridgeline L11 extended in the vehicle length direction. Similarly, the step structures 24A and 24B are formed in a structure for bending, in the vehicle height direction, a ridgeline L12 extended in the vehicle length direction at the vehicle width direction side ends of the upper plates 22A and 22B.

In general, when a load is input to a certain member, a transmission path (a load path) of the load is formed on a high-rigidity region (most resistant against the load) in the member. In the rear side rear member 20 having a sectional hat shape, when a load is input in the vehicle length direction, a main load path of the load is formed in a ridgeline extended in the vehicle length direction including the ridgelines L11 and L12. By bending the ridgelines L11 and L12, to which the main load is transmitted, with the step structures 24A and 24B, stress concentration occurs at bending points P1 and P2 (see FIG. 6) of the ridgelines L11 and L12. The bending points easily buckle as compared with the other regions.

As illustrated in FIGS. 2 and 6, the step structures 24A and 24B may have a slope shape inclining downward toward the front in a side view. The step structures 24A and 24B may have a perpendicular shape in the side view.

Figure 7:
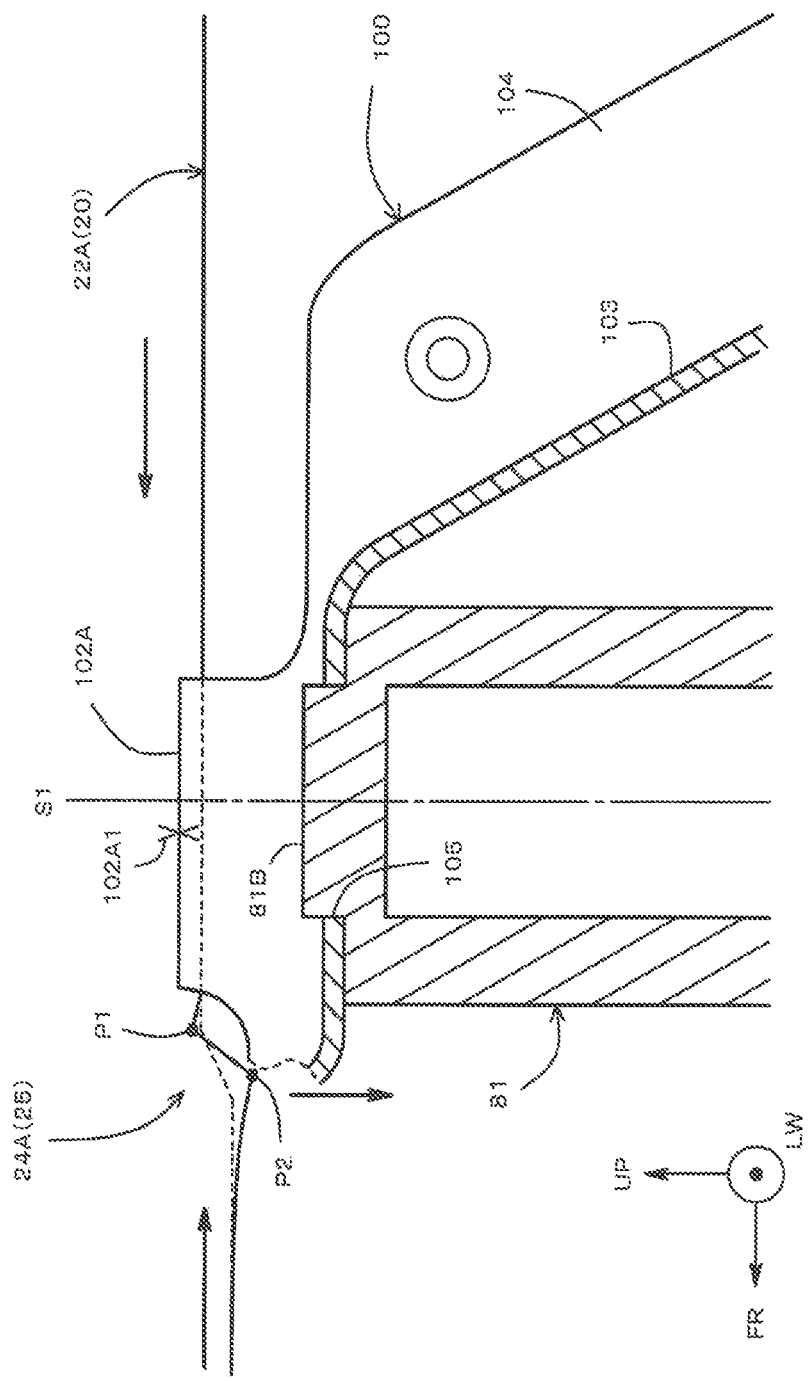
FIG. 7 is a diagram (2/3) for explaining the state during the rear collision of the vehicle rear structure according to the embodiment.
Figure 8:
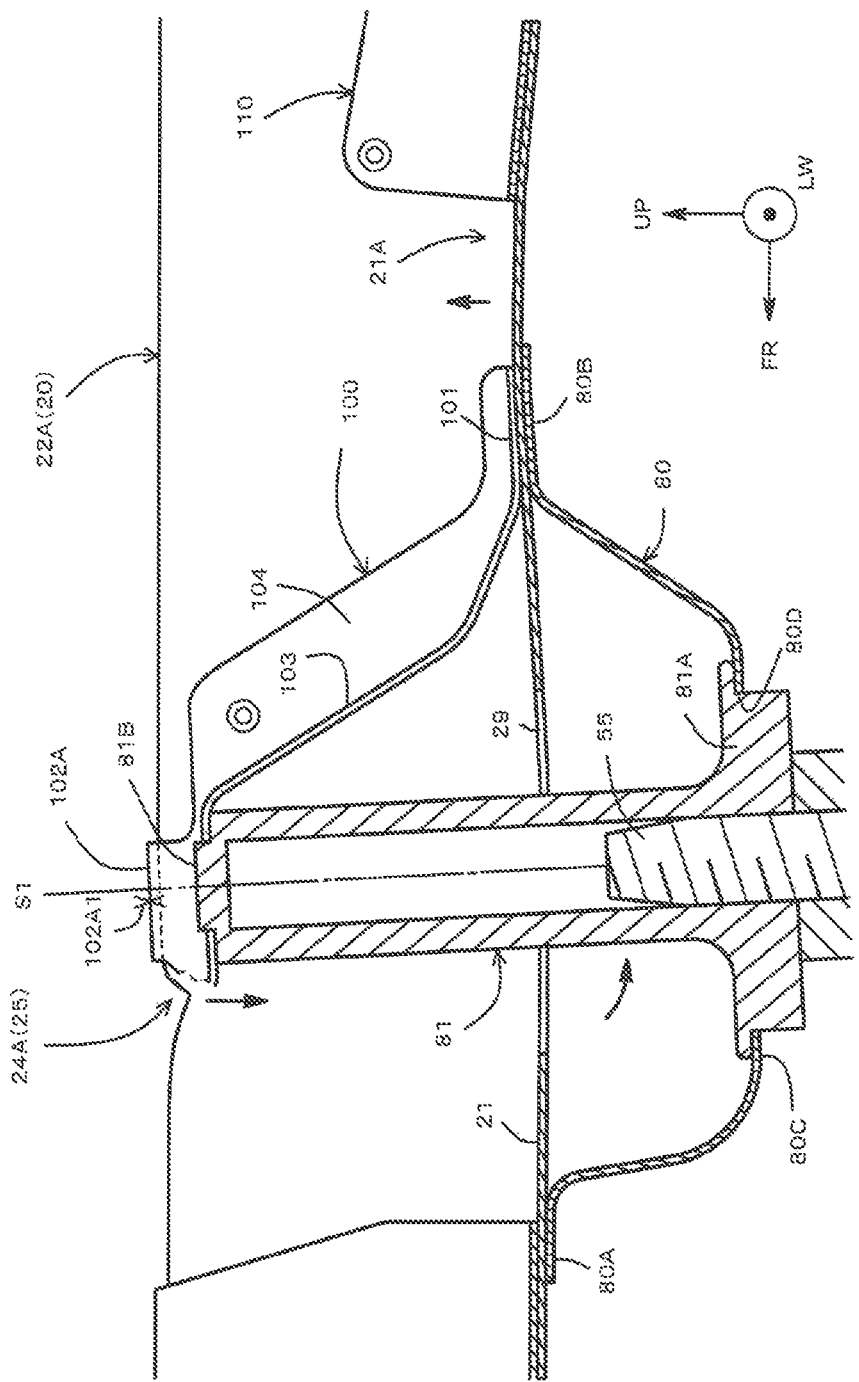
FIG. 8 is a diagram (3/3) for explaining the state during the rear collision of the vehicle rear structure according to the embodiment.

A process of buckling deformation in the step structures 24A and 24B is illustrated with reference to FIGS. 6 to 8. In FIGS. 6 to 8, only a vehicle width direction right side portion including the step structure 24A is shown. However, a vehicle width direction left side portion including the step structure 24B is also buckled and deformed in the same process. In FIGS. 6 to 8, illustration of the front end of the upper section 102 of the nut receiving bracket 100 is omitted.

An example of a rear collision initial period is shown in FIG. 6. A collision load is input in the vehicle length direction from the rear of the rear side rear member 20. Reaction to the collision load is generated from the front of the rear side rear member 20. The step structure 24A receives a compression load.

As illustrated in FIG. 7, according to the input of the compression load, the bending point P1 on the upper side of the step structure 24A is pushed upward and the bending point P2 on the lower side is pushed downward. At this time, the bending point P1 on the upper side and a portion behind the bending point P1 are pressed by the upper flange 102A of the nut receiving bracket 100. Therefore, a push-up width of the bending point P1 is suppressed. Solely the push-down of the lower side portion advances.

When the push-down (of the bending point P2) of the step structure 24A further advances, as illustrated in FIG. 8, the tube nut 81 behind the step structure 24A and the suspension member bolt 55 screwed in the tube nut 81 are turned counterclockwise in a side view; that is, the upward direction is turned toward the forward direction and the downward direction is turned toward the rearward direction.

According to such forward tilting turning of the tube nut 81 and the suspension member bolt 55, the suspension member bolt 54 in the front of the rear suspension member 50 (see FIG. 1) is turned to tilt forward in the same manner as the suspension member bolt 55. As a result, the rear suspension member 50 takes a forward tilting posture in which the front of the rear suspension member 50 is pushed downward.

Referring to FIG. 8, the flange 80B in the rear of the rear body mount bracket 80 is urged upward according to the forward tilting turning of the fastening axis S1. The rear end of the bottom section 101 of the nut receiving bracket 100 and the front end of the side member reinforce 110 are separated in the vehicle length direction. A region (a separation region 21A) having relatively low rigidity where the bottom plate 21 of the rear side rear member 20 is not reinforced by other members is provided. Buckling starts from the separation region 21A. The separation region 21A is bent and deformed upward.

When the rear of the fastening axis S1 is bent and deformed upward, the forward tilting turning of the fastening shaft S1 advances further. Further, according to the upward bending and deformation of the separation region 21A, the tube nut 81 and the suspension member bolt 55 around the separation region 21A are pulled upward. As a result, the rear arm 52 is lifted upward as compared with the front arm 51 of the rear suspension member 50. The forward tilting turning of the rear suspension member 50 advances further.

Figure 9:
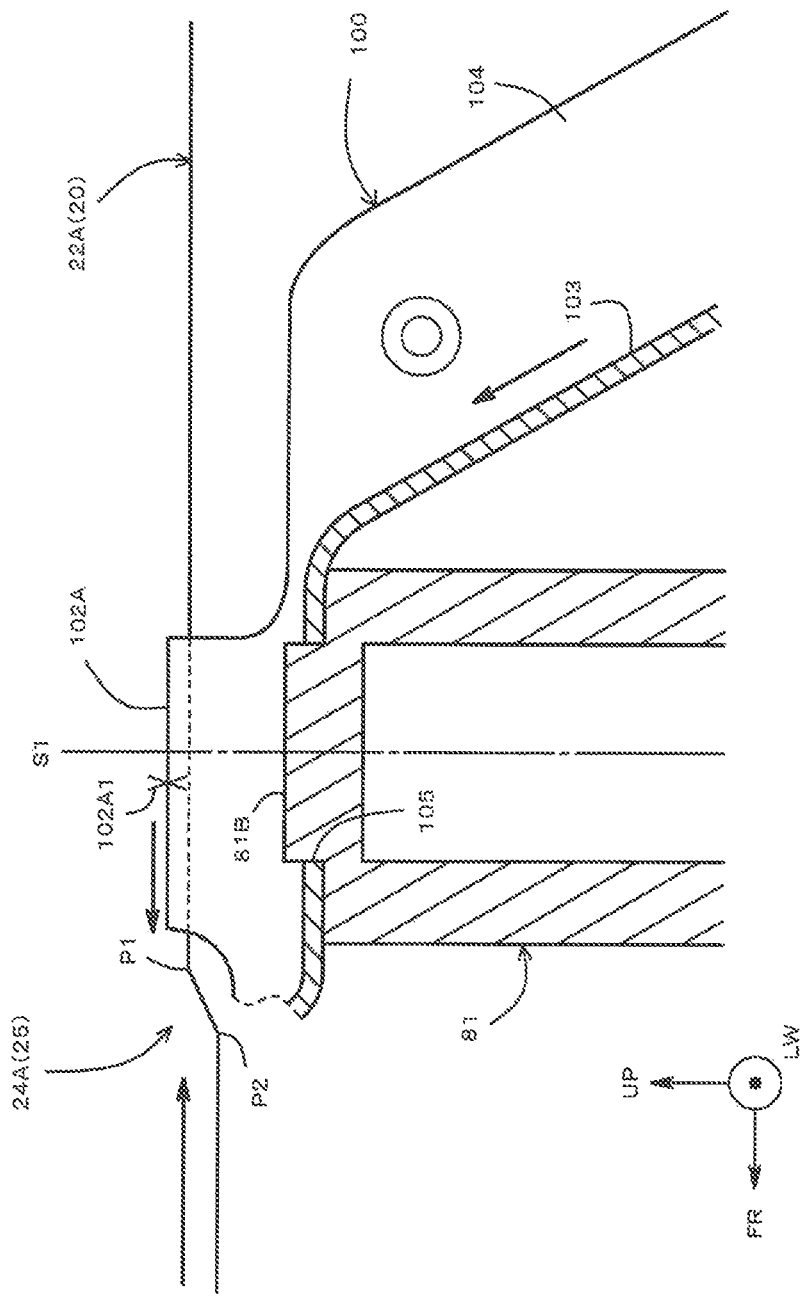
FIG. 9 is a diagram for explaining load transmission by a tube receiving bracket.

In FIG. 9, a transmission path of a load at the time when a rear collision shock is mainly input from the bottom plate 21 of the rear side rear member 20 is illustrated.

Depending on a collision form during rear collision, the bottom plate 21 becomes a main transmission path of a load rather than the upper plates 22A and 22B of the rear side rear member 20.

In such a case, the load is transmitted from the bottom plate 21 of the rear side rear member 20 to the upper plates 22A and 22B of the rear side rear member 20 via the nut receiving bracket 100. The subsequent load transmission process is the same as the load transmission process shown in FIGS. 7 and 8. The step structures 24A and 24B (the fragile sections 25) are bent downward.

OTHER EXAMPLES OF THIS EMBODIMENT

Figure 10:
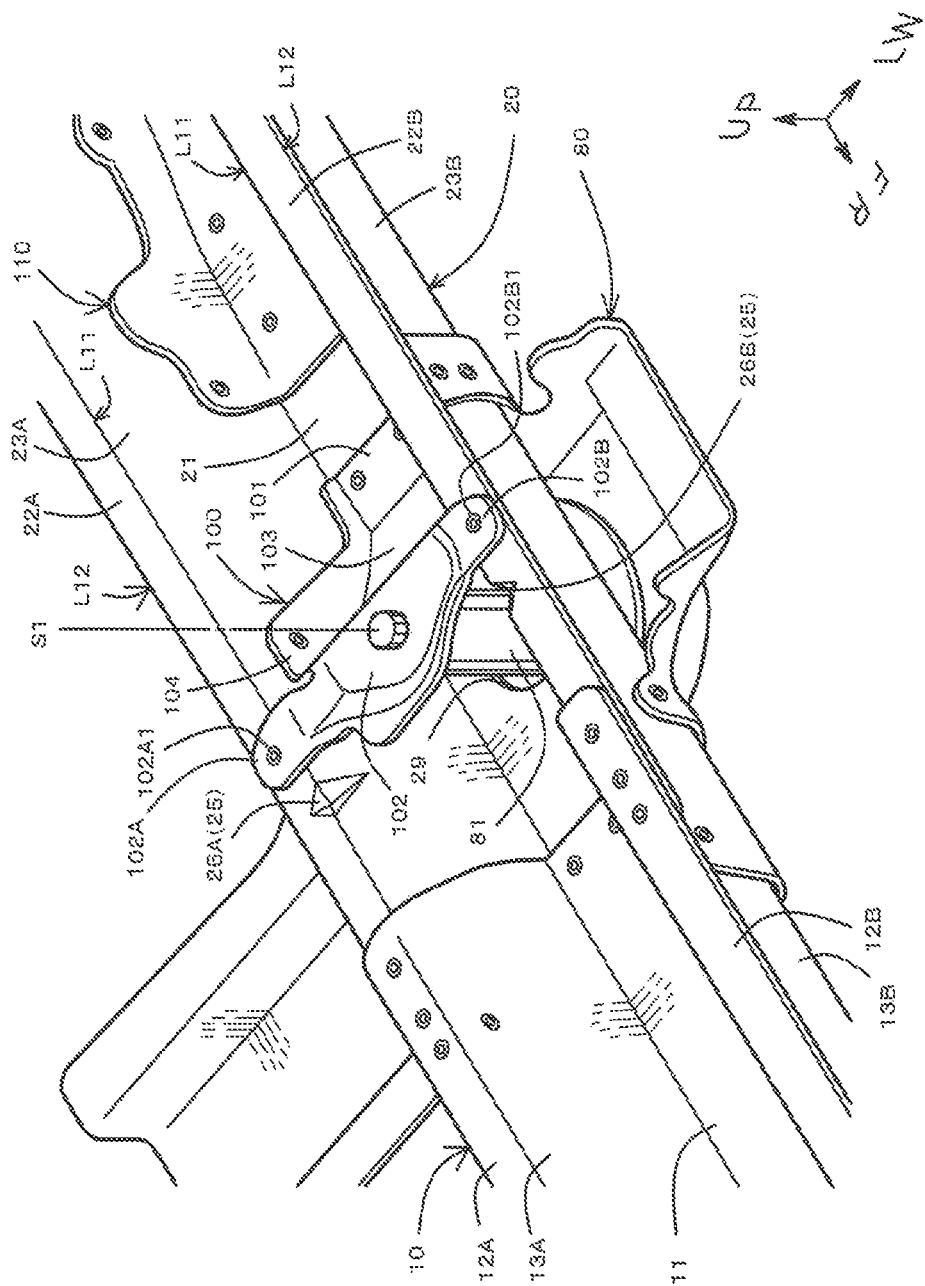
FIG. 10 is a perspective view showing another (first) example of the vehicle rear structure according to the embodiment.

In FIG. 10, another (first) example of the vehicle rear structure according to this embodiment is shown. As compared with the embodiment shown in FIG. 2, in the rear side rear member 20, cutouts 26A and 26B are formed as the fragile sections 25 instead of the step structures 24A and 24B. The other components are the same as the components in the embodiment shown in FIG. 2.

The cutouts 26A and 26B are formed to traverse, in the vehicle width direction, the ridgeline L11, which is the boundary between the upper plates 22A and 22B and the side plates 23A and 23B of the rear side rear member 20. The cutouts 26A and 26B are formed further frontward in the vehicle length direction than the fastening axis S1.

As explained above, the cutouts 26A and 26B are formed to traverse the ridgeline L11 that forms the main load path for a collision load. Therefore, the ridgeline L11 is bent in the vehicle height direction at the cutouts 26A and 26B. Therefore, as in the step structures 24A and 24B shown in FIG. 2, stress concentration occurs at a bending point of the ridgeline L11. Buckling of the bending point is facilitated.

Figure 11:
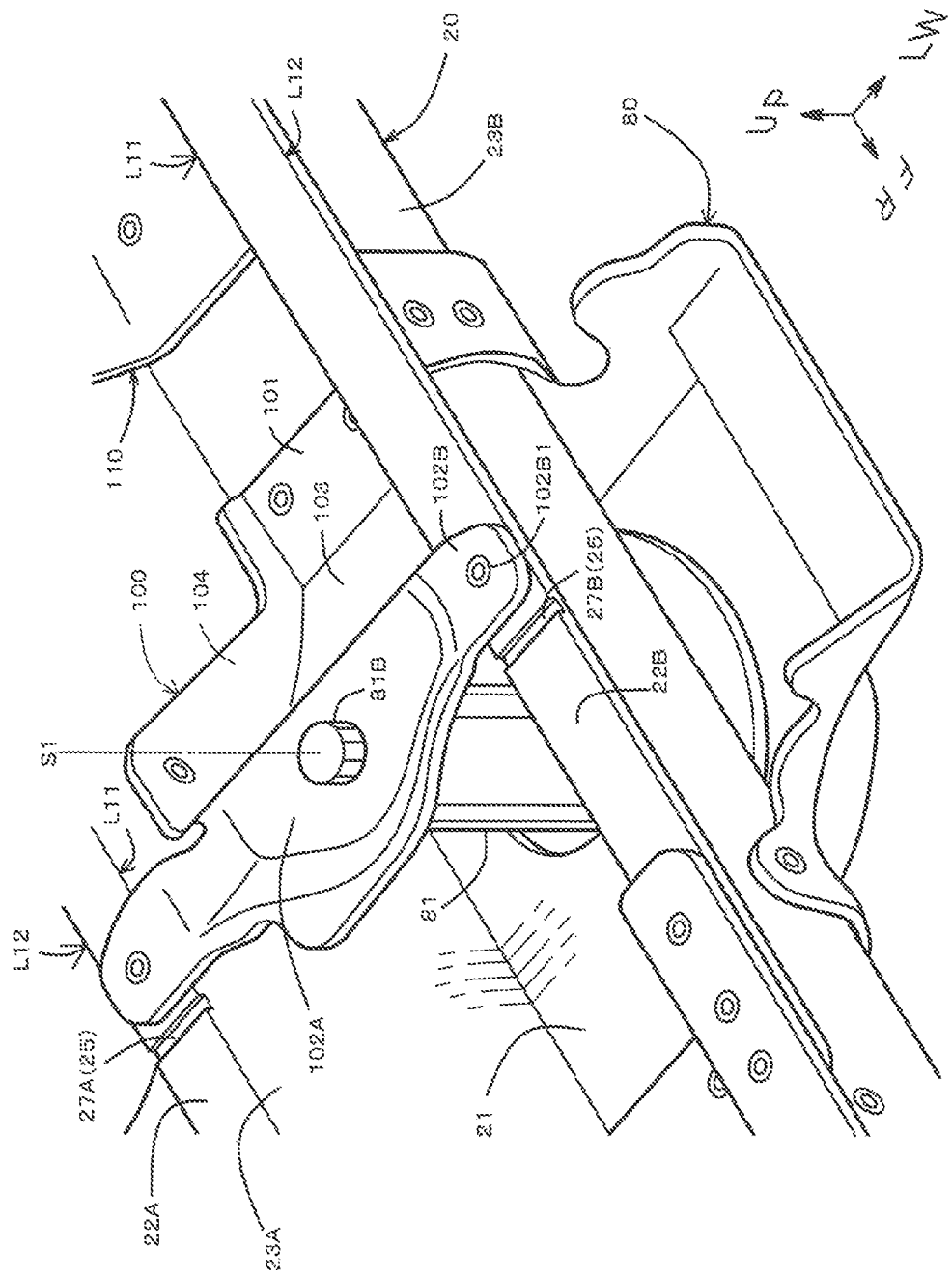
FIG. 11 is a perspective view showing another (second) example of the vehicle rear structure according to the embodiment.

In FIG. 11, another (second) example of the vehicle rear structure according to this embodiment is shown. As compared with the embodiment shown in FIG. 2, in the rear side rear member 20, thin sections 27A and 27B are formed as the fragile sections 25 instead of the step structures 24A and 24B. The other components are the same as the components in the embodiment shown in FIG. 2.

The thin sections 27A and 27B are formed on the upper plates 22A and 22B of the rear side rear member 20. The thin sections 27A and 27B are thin as compared with regions in the front and the rear in the vehicle length direction of the thin sections 27A and 27B. The thin sections 27A and 27B are formed further frontward in the vehicle length direction than the fastening axis S1. For example, the thin sections 27A and 27B are formed over the entire width in the vehicle width direction of the upper plates 22A and 22B.

As explained above, the thin sections 27A and 27B are formed to traverse the ridgelines L11 and L12 that form the main load path for a collision load. Therefore, the ridgelines L11 and L12 are bent in the vehicle height direction in the thin sections 27A and 27B. Therefore, as in the step structures 24A and 24B shown in FIG. 2, stress concentration occurs at bending points of the ridgelines L11 and L12. Buckling of the bending points is facilitated.

Figure 12:
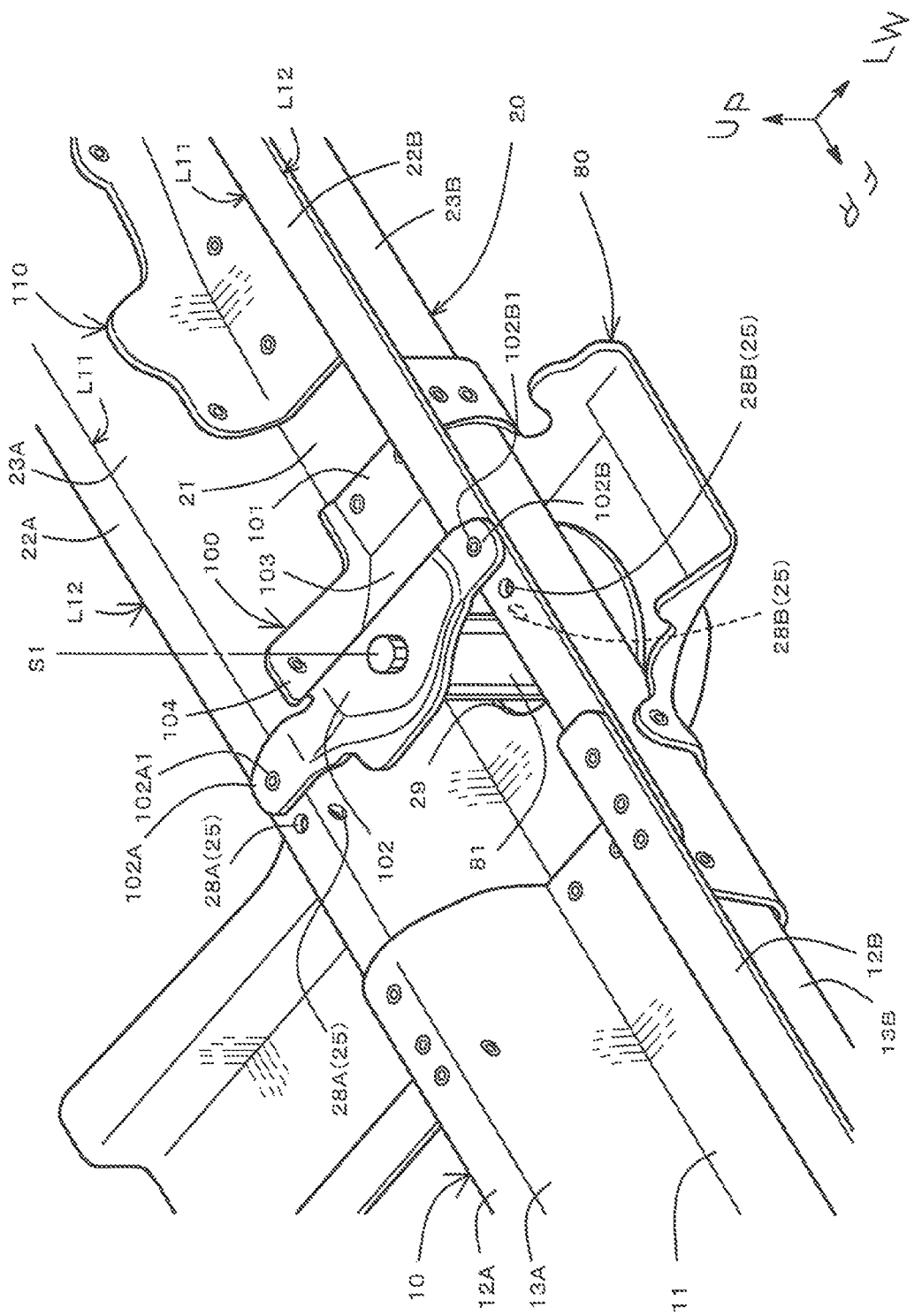
FIG. 12 is a perspective view showing another (third) example of the vehicle rear structure according to the embodiment.

In FIG. 12, another (third) example of the vehicle rear structure according to this embodiment is shown. As compared with the embodiment shown in FIG. 2, in the rear side rear member 20, through-openings 28A and 28B are formed as the fragile sections 25 instead of the step structures 24A and 24B. The other components are the same as the components in the embodiment shown in FIG. 2.

The through-openings 28A and 28B are formed on the upper plates 22A and 22B of the rear side rear member 20. The through-openings 28A and 28B may also be formed in upper portions of the side plates 23A and 23B. All the through-openings 28A and 28B are formed to pierce through the upper plates 22A and 22B and the side plates 23A and 23B in thickness directions. That is, the through-openings 28A and 28B provided on the upper plates 22A and 22B are pierced in the vehicle height direction. The through-openings 28A and 28B provided on the side plates 23A and 23B are pierced in the vehicle width direction.

As compared with the fragile sections 25 (the step structures 24, the cutouts 26, and the thin sections 27) shown in FIGS. 2, 10, and 11, the through-openings 28A and 28B are not formed to traverse the ridgelines L11 and L12 of the upper plates 22A and 22B. However, since the through-openings 28A and 28B are formed, regions of the through-openings 28A and 28B have low rigidity as compared with regions in the front and the rear in the vehicle length direction of the regions. Therefore, referring to FIGS. 4 and 5, when a compression load is input to the rear side rear member 20 during rear collision, the regions where the through-openings 28A and 28B are formed buckle earlier than the other regions. As a result, downward bending deformation of the rear side rear member 20 advances.

The present disclosure is not limited to the embodiment explained above and includes all changes and corrections not departing from the technical scope or the essence of the present disclosure specified by the claims.

The invention claimed is:

1. A vehicle rear structure, comprising:
rear side members provided on both sides in a vehicle width direction in a vehicle rear and extended in a vehicle length direction; and
a rear suspension member hung and supported by the rear side members, wherein
each of the rear side members includes a bottom plate, an upper plate, and a side plate that connects the bottom plate and the upper plate,
on the bottom plate, a front fastening section to which a vehicle length direction frontward of the rear suspension member is fastened upwardly by a fastening member, and a rear fastening section to which a vehicle length direction rearward of the rear suspension member is fastened upwardly by a fastening member are provided, and
on the upper plate, a fragile section is formed further forward than a center axis of the fastening member fastened to the rear fastening section and the fragile section is formed further rearward of the front fastening section.

2. The vehicle rear structure according to claim 1, wherein
the rear side member has a hat sectional shape opened upward including the bottom plate, a pair of the side plates, and a pair of the upper plates, and
in the pair of upper plates, a step structure is provided as the fragile section such that a ridgeline extended in the vehicle length direction is bent in a vehicle height direction.

3. The vehicle rear structure according to claim 2, wherein
a bracket coupled to the bottom plate and the upper plate of the rear side member is provided in the rear side member,
the bracket includes a bottom section coupled to the bottom plate of the rear side member, an upper section coupled to the upper plate, and an inclining section that connects the bottom section and the upper section and inclines front upward from the bottom section toward the upper section, and
the upper section of the bracket is coupled to the upper plate further rearward than the fragile section of the upper plate of the rear side member.

4. The vehicle rear structure according to claim 3, wherein
on the bottom plate of the rear side member, a reinforcing member is provided behind the bracket, and
the bracket and the reinforcing member are separated in the vehicle length direction.

5. The vehicle rear structure according to claim 1, wherein
the rear side member has a hat sectional shape opened upward including the bottom plate, a pair of the side plates, and a pair of the upper plates, and
a cutout is provided to traverse a ridgeline, which is a boundary between the upper plate and the side plate, in the vehicle width direction.

6. The vehicle rear structure according to claim 1, wherein, on the upper plate of the rear side member, a thin section having a small plate thickness as compared with front and rear regions in the vehicle length direction of the upper plate is formed as the fragile section.

7. The vehicle rear structure according to claim 1, wherein, on the upper plate of the rear side member, a through-opening piercing through the upper plate in a vehicle height direction is formed as the fragile section.

8. The vehicle rear structure according to claim 1, wherein the fragile section is formed further rearward than a center axis of the fastening member fastened to the front fastening section.

9. A vehicle rear structure, comprising:
rear side members provided on both sides in a vehicle width direction in a vehicle rear and extended in a vehicle length direction; and
a rear suspension member hung and supported by the rear side members, wherein
each of the rear side members includes a bottom plate, an upper plate, and a side plate that connects the bottom plate and the upper plate,
on the bottom plate, a front fastening section to which a vehicle length direction frontward of the rear suspension member is fastened upwardly by a fastening member, and a rear fastening section to which a vehicle length direction rearward of the rear suspension member is fastened upwardly by a fastening member are provided,
on the upper plate, a fragile section is formed further forward than a center axis of the fastening member fastened to the rear fastening section, and
a bracket coupled to the bottom plate and the upper plate of the rear side member is provided in the rear side member, the bracket includes a bottom section coupled to the bottom plate of the rear side member, an upper section coupled to the upper plate, and an inclining section that connects the bottom section and the upper section and inclines front upward from the bottom section toward the upper section, and the upper section of the bracket is coupled to the upper plate further rearward than the fragile section of the upper plate of the rear side member.

10. The vehicle rear structure according to claim 9, wherein
the rear side member has a hat sectional shape opened upward including the bottom plate, a pair of the side plates, and a pair of the upper plates, and
in the pair of upper plates, a step structure is provided as the fragile section such that a ridgeline extended in the vehicle length direction is bent in a vehicle height direction.

11. The vehicle rear structure according to claim 10, wherein
on the bottom plate of the rear side member, a reinforcing member is provided behind the bracket, and
the bracket and the reinforcing member are separated in the vehicle length direction.

12. The vehicle rear structure according to claim 9, wherein
on the bottom plate of the rear side member, a reinforcing member is provided behind the bracket, and
the bracket and the reinforcing member are separated in the vehicle length direction.

* * * * *